(12) United States Patent
Grove

(10) Patent No.: US 10,760,725 B2
(45) Date of Patent: Sep. 1, 2020

(54) SYSTEM AND METHOD FOR REDUCING ENVIRONMENTAL IMPACT CAUSED BY HYDRAULIC OIL LEAKING FROM A TRACTOR

(71) Applicant: Scott Grove, New Hampton, IA (US)

(72) Inventor: Scott Grove, New Hampton, IA (US)

(*) Notice: Subject to any disclaimer, the term of this patent is extended or adjusted under 35 U.S.C. 154(b) by 278 days.

(21) Appl. No.: 15/908,280

(22) Filed: Feb. 28, 2018

(65) Prior Publication Data

US 2018/0252349 A1   Sep. 6, 2018

Related U.S. Application Data

(60) Provisional application No. 62/466,178, filed on Mar. 2, 2017.

(51) Int. Cl.
| | | |
|---|---|---|
| *F16K 43/00* | (2006.01) | |
| *F16L 37/413* | (2006.01) | |
| *F15B 13/01* | (2006.01) | |
| *B23P 19/04* | (2006.01) | |
| *F15B 20/00* | (2006.01) | |
| *F16L 37/28* | (2006.01) | |
| *E02F 9/22* | (2006.01) | |

(52) U.S. Cl.
CPC ............ *F16L 37/413* (2013.01); *B23P 19/04* (2013.01); *F15B 13/01* (2013.01); *F15B 20/005* (2013.01); *F16L 37/28* (2013.01); *E02F 9/226* (2013.01)

(58) Field of Classification Search
CPC ..... F16L 5/10; F16L 37/0845; F16L 37/0926; F16L 37/413; Y10T 137/87273; Y10T 137/87965; Y10T 137/87973
See application file for complete search history.

(56) References Cited

U.S. PATENT DOCUMENTS

| | | | |
|---|---|---|---|
| 836,989 A | 11/1906 | Oliver | |
| 2,272,811 A * | 2/1942 | Tracy | .................... F16L 17/035 |
| | | | 277/619 |
| 3,384,394 A * | 5/1968 | O'Connor | ............. F16L 41/005 |
| | | | 285/190 |
| 3,659,881 A | 5/1972 | Tinsley et al. | |
| 4,062,495 A | 12/1977 | Luck | |
| 5,403,042 A | 4/1995 | Negron | |
| 5,516,157 A | 5/1996 | Williamson | |
| 5,533,764 A | 7/1996 | Williamson | |
| 5,797,431 A | 8/1998 | Adams | |
| 5,803,360 A | 9/1998 | Spitznagel | |
| 7,703,814 B2 | 4/2010 | Wei | |

* cited by examiner

*Primary Examiner* — Reinaldo Sanchez-Medina
(74) *Attorney, Agent, or Firm* — Simmons Perrine Moyer Bergman PLC

(57) ABSTRACT

A method and system for reducing leakage of hydraulic oil from a hydraulic outlet on a tractor, which involves removal of the female quick connect coupler from a legacy original equipment selective control valve and inserting into the void the following: a three part insert with a front stepped diameter segment, a back section, which is screwed into front stepped diameter segment, a sleeve which is configured to be inserted after a front O-ring is adjusted and a leading portion of a retention bolt.

13 Claims, 8 Drawing Sheets

SYSTEM AND METHOD FOR REDUCING ENVIRONMENTAL IMPACT CAUSED BY HYDRAULIC OIL LEAKING FROM A TRACTOR

CROSS REFERENCE TO RELATED APPLICATIONS

This application claims the benefit of provisional application filed on Mar. 2, 2017 and having Ser. No. 62/466,178; by the same inventor, which is hereby incorporated herein in its entirety by this reference.

FIELD OF THE INVENTION

The present invention generally relates to tractors, and more specifically to tractors with hydraulic outlets for providing hydraulic power to implements which utilize hydraulic power for operation, and even more specifically relates to hydraulic outlets which have internally integrated female quick connect couplers.

BACKGROUND OF THE INVENTION

In the past, many tractors have provided a hydraulic outlet for use by implements which use hydraulic power for operation. Typically, these hydraulic outlets accept hoses from implements to couple through standardized quick connect couplers. Depending upon the nature of the particular needs and applications, these outlets may be coupled and uncoupled several times a day or more.

While these hydraulic outlets have successfully provided hydraulic power to many implements, in some instances these hydraulic outlets begin to leak hydraulic oil and result in contamination of the soil by exposure to hydraulic oil and therefore need to be serviced and/or be rebuilt frequently, often at a cost of hundreds of dollars per service event.

Consequently, there exists a need for improved environmentally friendly methods and systems for providing sources of hydraulic power to implements which are more robust and dramatically decrease leakage of hydraulic oil and the concomitant need to repair or rebuild the hydraulic outlet.

SUMMARY OF THE INVENTION

It is an object of the present invention to provide an environmentally friendly system for coupling hydraulic hoses into a tractor's hydraulic outlet which decrease pollution and decreases the mean time between servicing of the hydraulic outlet.

It is a feature of the present invention to utilize an adjustable semi-permanent hydraulic outlet insert, having an adjustable outside diameter characteristic, which is configured to easily fit inside a legacy hydraulic outlet opening and be expanded once inserted.

It is an advantage of the present invention to reduce the amount of leakage of hydraulic oil and frequency of the need to repair and/or rebuild the tractor's hydraulic outlet.

It is another object of the present invention to reduce the cost of replacing a female quick connect coupler which is associated with the hydraulic outlet and of the type configured to accept hoses with a male quick connect coupler attached thereto.

It is another feature of the present invention to provide a screw-in commercial off-the-shelf female quick connect coupler which is configured to screw into an exposed end of the semi-permanent hydraulic outlet insert.

It is another advantage of the present invention to allow for dramatic reduction in cost of replacing the wear parts of a female quick connect coupler.

The present invention is a system and method for reducing: leakage of hydraulic oil, a need to repair and/or rebuild hydraulic outlets on tractors and the cost of making such repairs.

Accordingly, the present invention is a method of reducing soil contamination caused by infiltration of hydraulic oil leaking from a tractor, comprising the steps of:

providing a selective control valve thereon for provisioning hydraulic oil under pressure and having a first coupler orifice therein and a second coupler orifice therein; said first coupler orifice having a first quick release mechanism disposed therein;

remove a snap ring exposing said first quick release mechanism;

remove a barrel from said first coupler orifice;

remove two O-rings through said first coupler orifice;

insert through said first coupler orifice, until seated therein, an insert assembly having an insert maximum diameter portion, intermediate diameter portion, a minimum diameter portion, an opposing face, a front O-ring, an interior section, a back O-ring, a back portion, a back flat face portion, and an interior back face;

by rotatably engaging one of said back portion and said back flat face portion, tighten said interior section toward said minimum diameter portion at said opposing face, thereby causing an increase in an outside diameter of said front O-ring disposed between said opposing face and said interior section;

move said sleeve over said back portion until engaged with said back O-ring;

install said retention bolt through said large washer into an internally threaded portion of said interior section at said interior back face; and tighten said retention bolt thereby causing an outside diameter of said back O-ring to increase.

Additionally, the present invention is an apparatus for reducing leakage of hydraulic oil from a selective control valve comprising:

a front stepped diameter segment with a central axial fluid channel therethrough extending from an insert exterior face, with a face orifice therein, to an opposing face, said front stepped diameter segment being sized and configured to be inserted in a first coupler orifice in a selective control valve;

a back section with a back section longitudinal axis, extending from an interior front face, having an oil passage port therethrough, to an interior back face, of a back portion of said back section, and an oil receiving orifice disposed between said interior front face and extending therethrough transverse to the back section longitudinal axis;

the face orifice being in fluid communication with the oil receiving orifice;

a front O-ring disposed between said opposing face and a rotating compressing face located on a central portion of said back section, said front O-ring is compressed and made to have an increasing outside diameter when said back portion is rotated;

a sleeve, having a sleeve front face, configured to be disposed over a back portion of said back section; and a back O-ring disposed between a back O-ring mating face and said sleeve front face; and a threaded retention fastener configured to rotatably mate with a threaded interior portion of said back portion, and configured to cause an outside diameter of said back O-ring to increase when said threaded retention fastener is advanced into said threaded interior portion of said back portion.

BRIEF DESCRIPTION OF THE DRAWINGS

The invention may be more fully understood by reading the foregoing description of the preferred embodiments of the invention, in conjunction with the appended drawing wherein.

DETAILED DESCRIPTION

Although described with particular reference to tractors, the systems and methods of the present invention can be implemented in many different ways and with different types of systems and for different purposes, the embodiments described herein are merely examples of the many possible variations.

Figure 1:
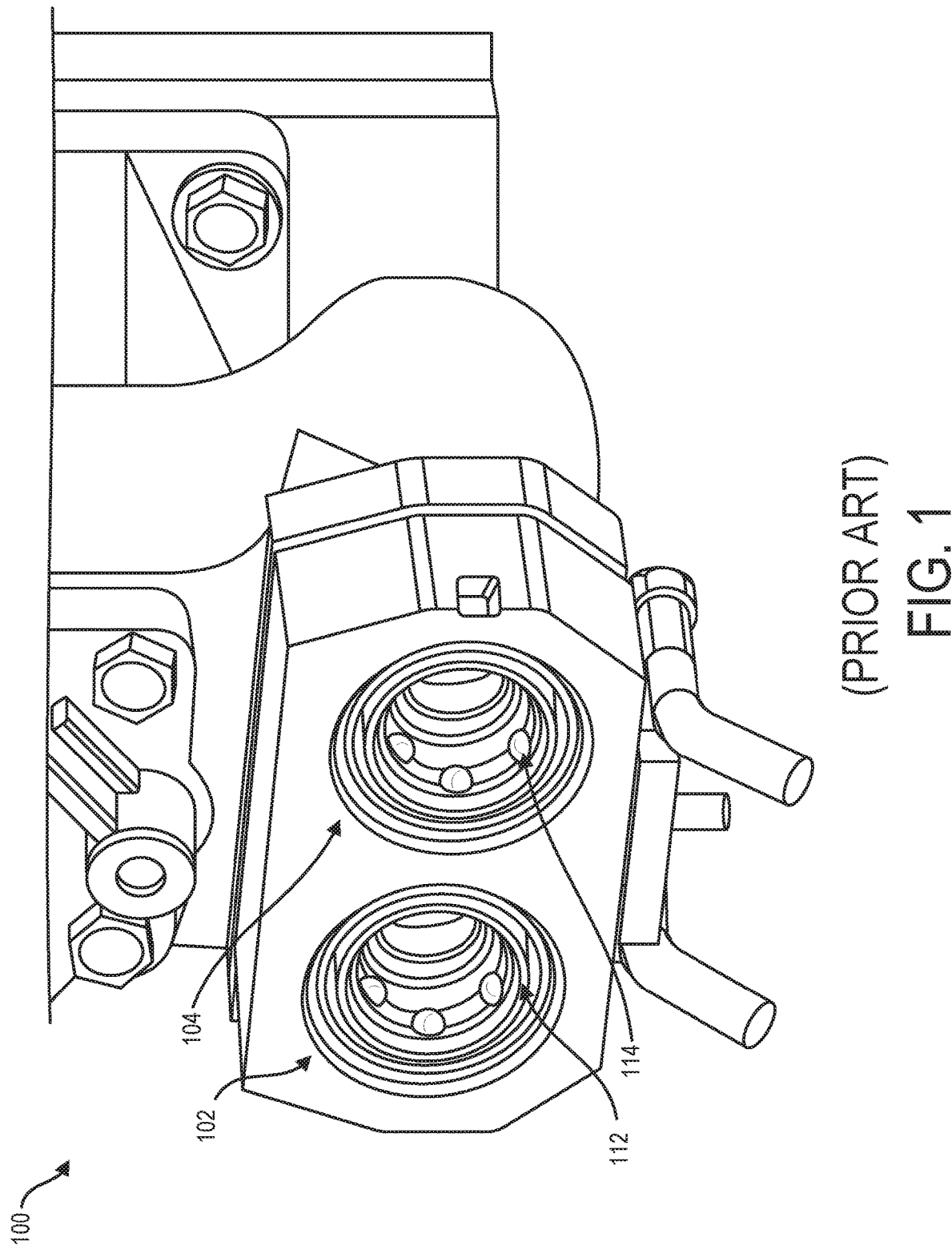
FIG. 1 is a pictorial representation of the prior art.

Now referring to the drawings wherein like numerals refer to like matter throughout, there is shown in FIG. 1 a representation of the prior art. The term "legacy original equipment selective control valve" is hereby defined to mean: an original equipment selective control valve of the type that was standard equipment on tractors made by Deere and Company of Moline Ill. during the years 1964 through 1982. FIG. 1 shows a legacy original equipment selective control valve 100. During the years 1961-1963, 1983 through 1994, minor dimensional differences occurred in these SCVs, however, the present invention can be readily adapted to function for such additional years. The legacy original equipment selective control valve 100 contains a first OEM quick release mechanism 112 which fits in first coupler orifice 102 and a second OEM quick release mechanism 114 which fits in second coupler orifice 104. Both first OEM quick release mechanism 112 and second OEM quick release mechanism 114 need to be removed to allow for insertion of the present invention.

Figure 2:
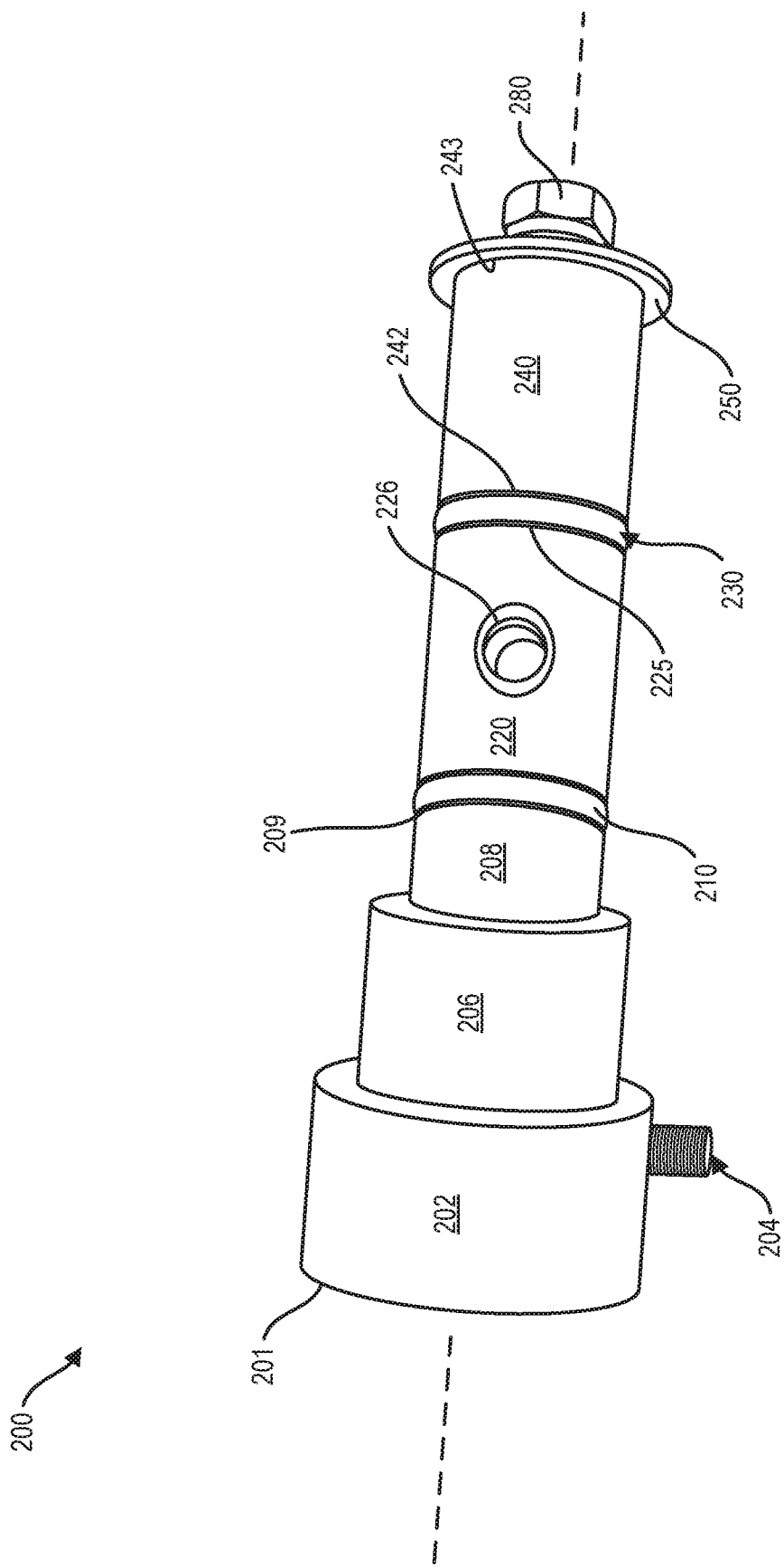
FIG. 2 is a pictorial representation of a side view of the present invention.

Now referring to FIG. 2, there is shown an assembled view of the insert assembly 200 of the present invention. Insert assembly 200 is designed to be inserted to either first coupler orifice 102 or second coupler orifice 104. All of the components of insert assembly 200 are inserted into the front opening of first coupler orifice 102 as shown in FIG. 1, except for the retention bolt 280, lock washer 270, intermediate washer 260 and large washer 250. Insert assembly 200 is shown with an insert exterior face 201, insert maximum diameter portion 202, intermediate diameter portion 206 and minimum diameter portion 208, which are all made from a single machined piece of metal. Any suitable metal may be used, but stainless steel may be the preferred material. Insert maximum diameter portion 202 is shown with an indexing protuberance screw 204 disposed in an indexing protuberance screw threaded hole 205 therein. Indexing screw 204 is used to assure the proper orientation of the front stepped diameter segment 200A when it is inserted into first coupler orifice 102 or second coupler orifice 104. Alternate designs of a mechanism for indexing could be used, including a protuberance integrated with the insert maximum diameter portion 202. Intermediate diameter portion 206 of front stepped diameter segment 200A is configured to fit in a segment of the first coupler orifice 102 or second coupler orifice 104. Minimum diameter portion 208, at the point of opposing face 209, is substantially similar in diameter to interior section 220 of back section 200B, which also contains interior front face 221, front unthreaded section 222, and threaded section 223. Back section 200B includes interior section 220 with an oil receiving orifice 226. Back O-ring mating face 225 corresponds to the opposing face 209 of front stepped diameter segment 200A. Front O-ring 210 is disposed between front stepped diameter segment 200A and back section 200B at the opposing face 209. Similarly, back O-ring 230 is disposed between back section 200B at its back O-ring mating face 225, and sleeve front face tapered transition 242 of sleeve 240 of back section sleeve 200C, which has a sleeve back face 243.

Figure 3:
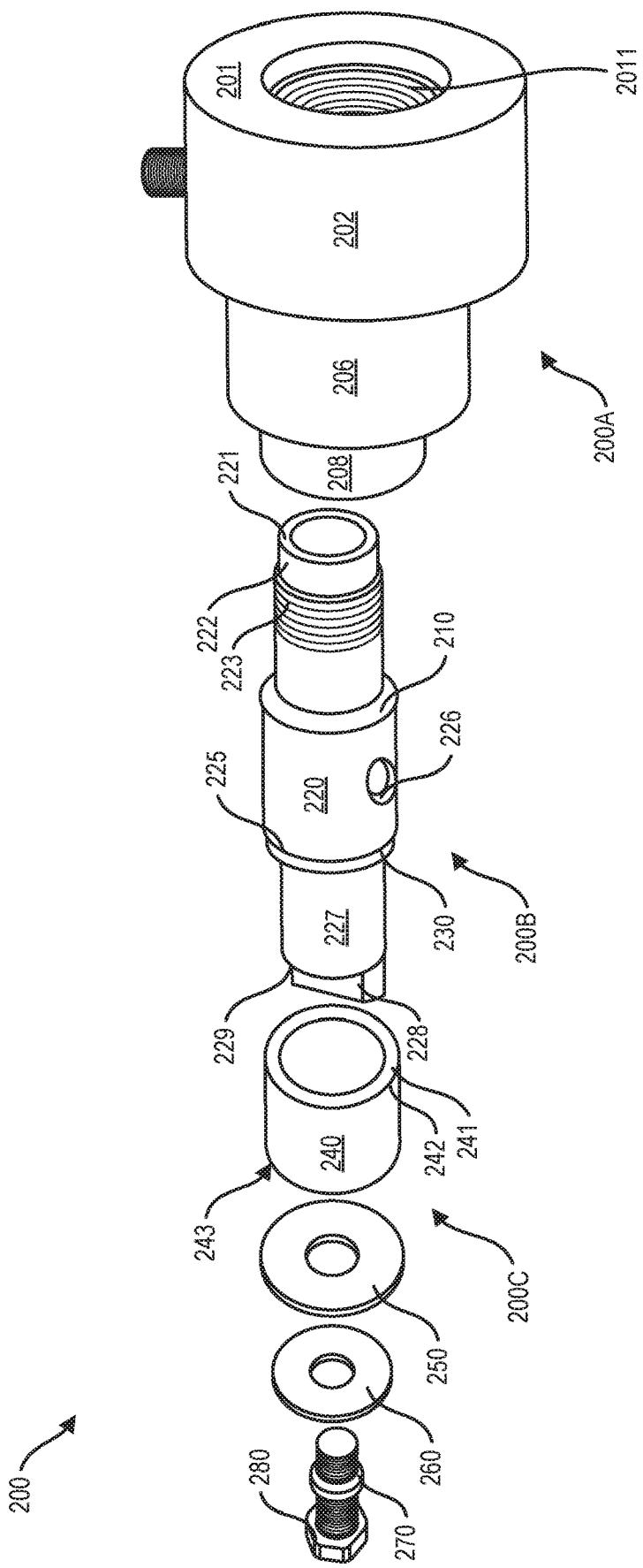
FIG. 3 is an exploded perspective view of the present invention.

Now referring to FIG. 3, there is shown back section 200B which includes back portion 227, back flat face portion 228 and interior back face 229. Back flat face portion 228 is used to facilitate turning the back section 200B, with a wrench or other suitable tool, when it is being screwed into front stepped diameter segment 200A. The diameter of front O-ring 210 can be adjusted by opening and closing the gap between opposing face 209 and the leading face the maximum diameter portion of interior section 220.

Figure 4:
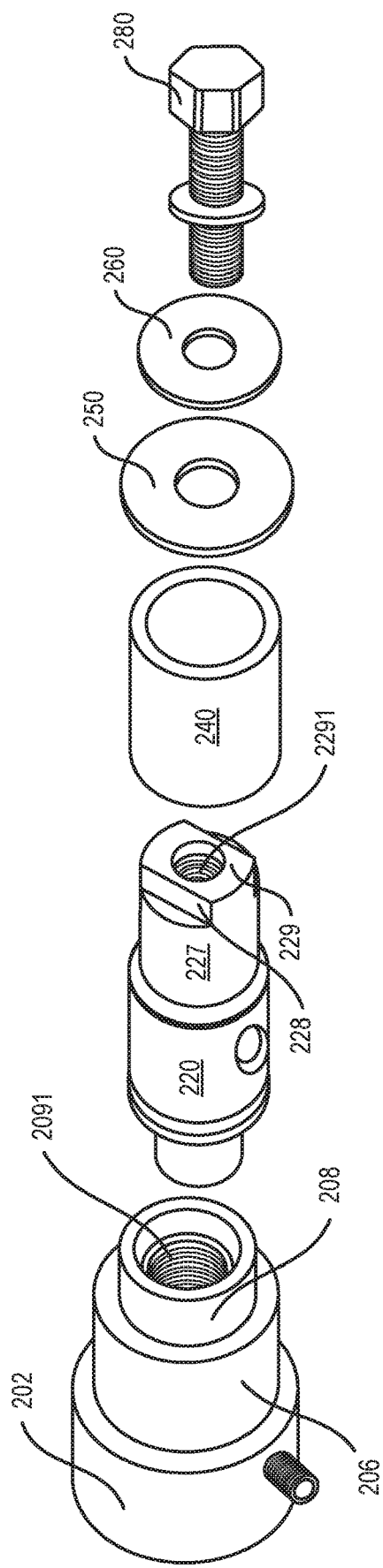
FIG. 4 is another exploded perspective view of the present invention from a perspective different from FIG. 3.

Now referring to FIG. 4, which shows the insert assembly 200 in exploded views, but from different perspectives. The diameter of back O-ring 230 can be adjusted by tightening the retention bolt 280 into the threaded internal portion of interior back face 229 when the sleeve 240 is disposed about the unthreaded back portion 227 and while large washer 250, and optionally intermediate washer 260, and lock washer 270 are properly connected.

Figure 5:
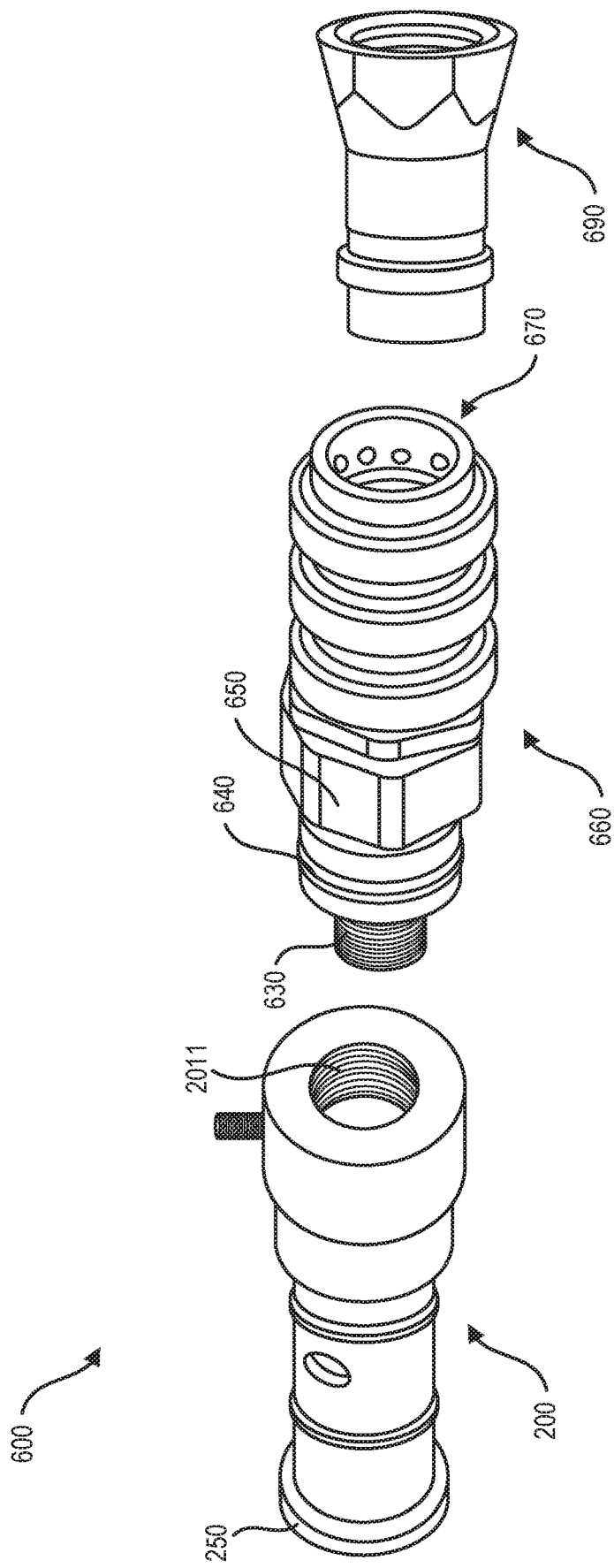
FIG. 5 is an exploded perspective view of the present invention in combination with components well known in the prior art.

Now referring to FIG. 5, there is shown an exploded view of the present invention exploded assembly 600, with insert assembly 200 of the present invention in combination with prior devices, such as quick release coupler 660 with its quick release female end 670 and with attached hexagonal wrench mating section 650, threaded rear mating section O-ring 640, and threaded rear mating section 630, which is configured to mate with the threads in the front portion of insert maximum diameter portion 202.

Figure 6:
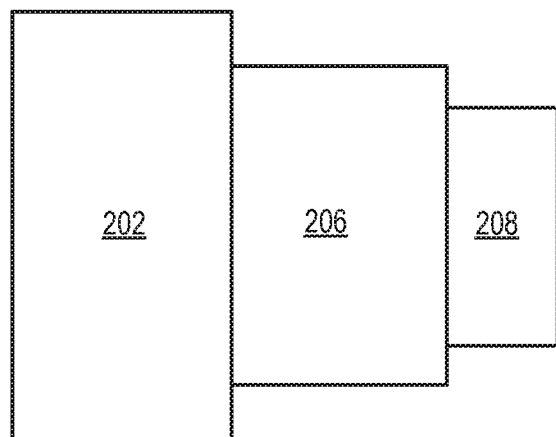
FIG. 6 is a side view of the front stepped diameter segment 200A of FIG. 3.

Now referring to FIG. 6, there is shown a side view of the front stepped diameter segment 200A with dimensions which may represent a best mode of the present invention.

Figure 7:
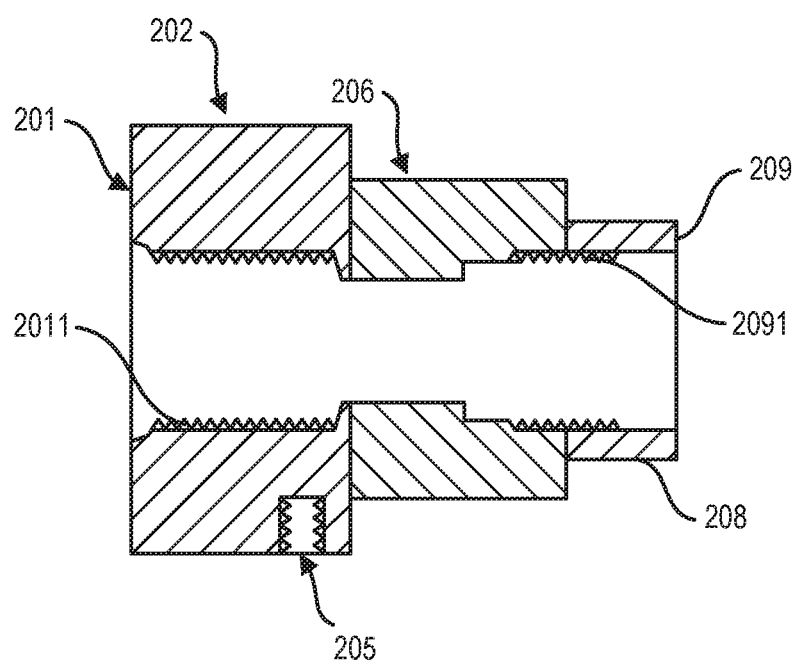
FIG. 7 is a cross-sectional view of the front stepped diameter segment 200A of FIG. 6.

Now referring to FIG. 7, there is shown a cross-sectional view of the front stepped diameter segment 200A of FIG. 6, which includes; an internal face threaded portion 2011 and a minimum diameter portion internal threading 2091.

Figure 8:
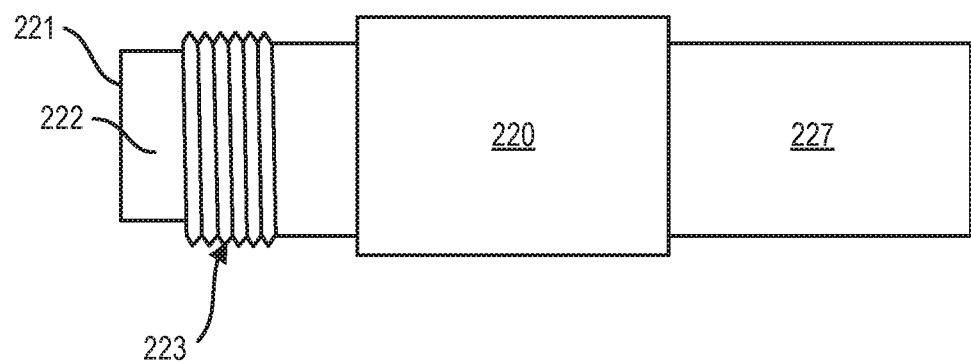
FIG. 8 is a side view of the back section 200B of FIG. 3.

Now referring to FIG. 8, there is shown a side view of the back section 200B of the present invention (without back flat face portion 228) being shown.

Figure 9:
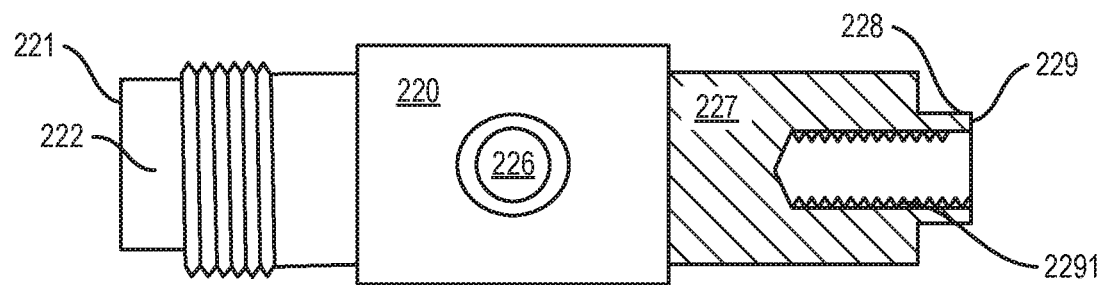
FIG. 9 is an alternate view of the back section 200B from a different perspective from FIG. 3.
Figure 10:
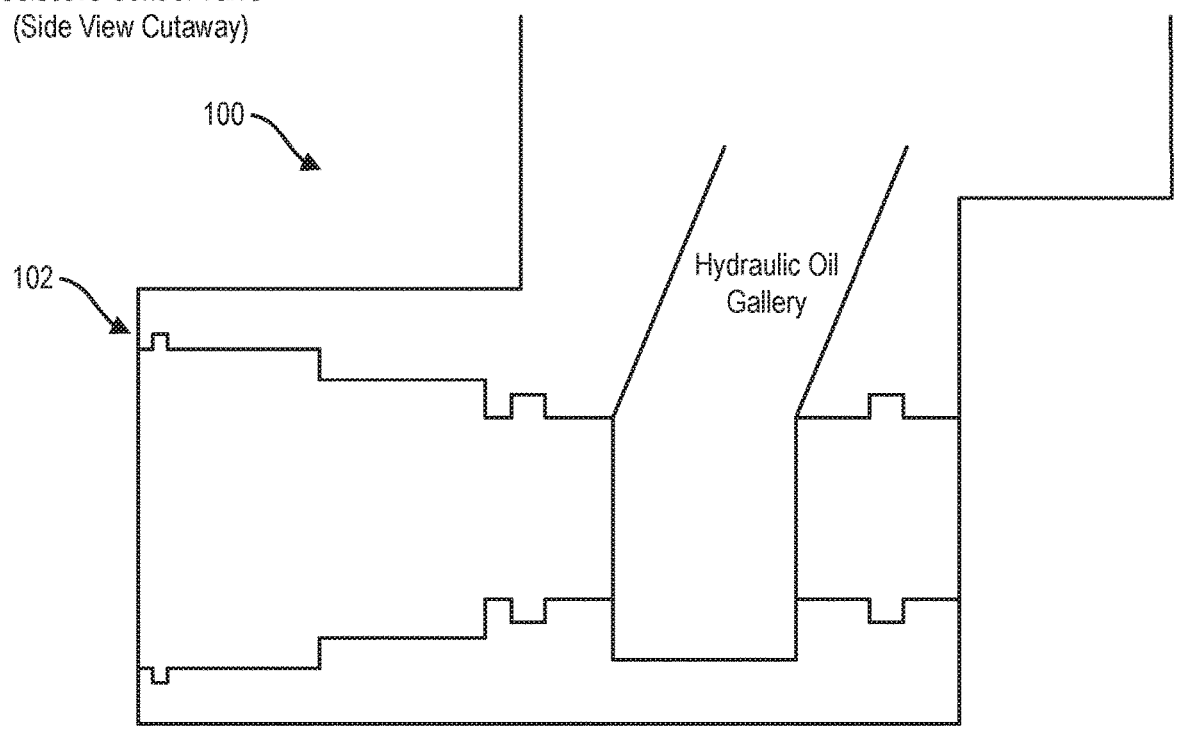
FIG. 10 is a side view cutaway of the prior art.

Now referring to FIG. 9, there is shown an alternate view of the back section 200B from a different perspective. Note that a portion is shown in cut-away view, which shows internally threaded back face void 2291.

The method of installing the apparatus described above is as follows:

Before starting job, remember to park machine safely, lower all equipment to the ground, put in park/set parking brake, stop the engine and remove the key, work in clean area, clean work area and machine, make sure you have all necessary tools to do the job, read all instructions thoroughly, do not attempt shortcuts, and clean valve area thoroughly, front and rear, prior to disassembly.

STEP 1. Remove OEM snap rings.
  a. Remove and retain snap rings.
STEP 2. Remove expansion plugs.
  a. Remove expansion plugs from the top of the valve body.
  b. Use a sharp punch and hammer.
STEP 3. Remove e-clips and springs.
  a. Remove e-clips and springs from coupler barrel levers located under expansion plugs.
  b. Discard e-clips, springs, and levers, new parts are provided with kit.
  c. Remove barrels from SCV housing.
STEP 4. Remove OEM O-rings and backers.
  a. Remove OEM O-rings and backers from SCV bore using a long O-ring pick.
  b. Two O-rings and two backers per bore.
STEP 5. Clean SCV bore.
  a. This step is very important as damage to new O-rings may occur if this step is neglected.
  b. Brake and parts cleaner is recommended.
  c. Blow dry with compressed air once debris is washed away.
STEP 6. Inspect valve body bore face.
  a. Assure that no damage has occurred to valve body bore face.
  b. If damage is visible, use rat tail file or a half round file to smooth the surfaces.
  c. If a file is used, repeat step 5.
STEP 7. Remove insert assembly 200 from package.
  a. Remove 5/16" cap screw, i.e. retention bolt 280, and washer from the rear half of the insert assembly 200.
  b. Remove O-ring expansion sleeve 240.
  c. Apply grease or assembly lube liberally to front O-ring 210 and back O-ring 230.
STEP 8. Install insert assembly 200 into valve body through one of first coupler orifice 102 and second coupler orifice 104.
  a. Gently install insert assembly 200 into valve body, making sure indexing screw 204 on the front half of the insert assembly 200 is in the 12 o'clock position (light tapping may be required).
  b. Use a rubber mallet to reduce risk of damage.
  c. (DO NOT FORCE) O-ring damage may result.
  d. When insert assembly 200 is firmly seated, install OEM snap ring into the valve body.
STEP 9. Install aftermarket hydraulic couplers.
  a. Breakaway coupler/quick release coupler 660 included in kit, tighten with open end wrench.
  b. Damage to valve body may result in the event of implement breakaway if these couplers are not used.
  c. Rotate insert and coupler assembly by hand counter clockwise until it stops.
STEP 10. Tighten Insert.
  a. Using a 5/8" open end wrench, tighten the rear half of the insert firmly at back flat face portion 228 of interior back face 229.
  b. Install the compression sleeve 240 onto the rear half of the insert assembly 200.
  c. Install the 5/16" cap screw/retention bolt 280, flat washer, large washer 250 and lock washer using a ½" box end wrench and tighten firmly.
STEP 11. Install supplied expansion plugs.
  a. Install expansion plugs onto the top of the valve using a hammer and a punch.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. A method of reducing environmental soil contamination caused by infiltration of hydraulic oil leaking from a tractor, comprising the steps of:
    provide a selective control valve thereon for provisioning hydraulic oil under pressure and having a first coupler orifice therein and a second coupler orifice therein; said first coupler orifice having a first quick release mechanism disposed therein;
    expose said first quick release mechanism;
    insert through said first coupler orifice, until seated therein, an insert assembly having an insert maximum diameter portion, intermediate diameter portion, a minimum diameter portion, an opposing face, a front O-ring, an interior section, a back O-ring, a back portion, a back flat face portion, and an interior back face;
    by rotatably engaging one of said back portion and said back flat face portion, tighten said interior section toward said minimum diameter portion at said opposing face, thereby causing an increase in an outside diameter of said front O-ring disposed between said opposing face and said interior section;
    move a sleeve over said back portion until engaged with said back O-ring;
    install a retention bolt through a large washer into an internally threaded portion of said interior section at said interior back face; and
    tighten said retention bolt, thereby causing an outside diameter of said back O-ring to increase.

2. The method of claim 1 wherein said selective control valve is a legacy original equipment selective control valve.

3. The method of claim 1 wherein said large washer has a larger outside diameter than said sleeve.

4. The method of claim 3 wherein said interior section has an interior front face, a front unthreaded section and a threaded section.

5. The method of claim 4 wherein one of said minimum diameter portion and said intermediate diameter portion has an intermediate internally threaded orifice portion which is configured to mate with said threaded section.

6. The method of claim 5 wherein said step of rotatably engaging one of said back portion and said back flat face portion involves a mating of said threaded section with said intermediate internally threaded orifice portion.

7. The method of claim 6 where said sleeve is configured to slide over said back portion.

8. The method of claim 7 wherein said back portion is an externally unthreaded back portion.

9. The method of claim 8 wherein said back flat face portion is configured to mate with and be turned by a wrench.

10. The method of claim 9 wherein on of said insert maximum diameter portion and said intermediate diameter portion has an indexing protuberance extending externally therefrom.

11. A method of reducing environmental soil contamination caused by infiltration of hydraulic oil leaking from a tractor, comprising the steps of:
provide a selective control valve thereon for provisioning hydraulic oil under pressure and having a first coupler orifice therein and a second coupler orifice therein; said first coupler orifice having a first quick release mechanism disposed therein:
expose said first quick release mechanism;
insert through said first coupler orifice, until seated therein, an insert assembly having an insert maximum diameter portion, intermediate diameter portion, a minimum diameter portion, an opposing face, an interior section, a back portion, a back flat face portion, an interior back face;
move a sleeve over said back portion until engaged with a back O-ring; and
provide a large washer which has a larger outside diameter than said sleeve.

12. The method of claim 11 where said sleeve is configured to slide over said back portion.

13. A method of reducing environmental soil contamination caused by infiltration of hydraulic oil leaking from a tractor, comprising the steps of:
provide a selective control valve thereon for provisioning hydraulic oil under pressure and having a first coupler orifice therein and a second coupler orifice therein; said first coupler orifice having a first quick release mechanism disposed therein:
expose said first quick release mechanism;
insert through said first coupler orifice, until seated therein, an insert assembly having an insert maximum diameter portion, intermediate diameter portion, a minimum diameter portion, an opposing face, an interior section, a back portion, a back flat face portion, and an interior back face; and
move a sleeve over said back portion until engaged with a back O-ring and wherein said interior section has an interior front face, a front unthreaded section and a threaded section.

* * * * *